I. W. NONNEMAN.
PIPE THREADING TOOL.
APPLICATION FILED JAN. 19, 1914.
1,115,727.
Patented Nov. 3, 1914.
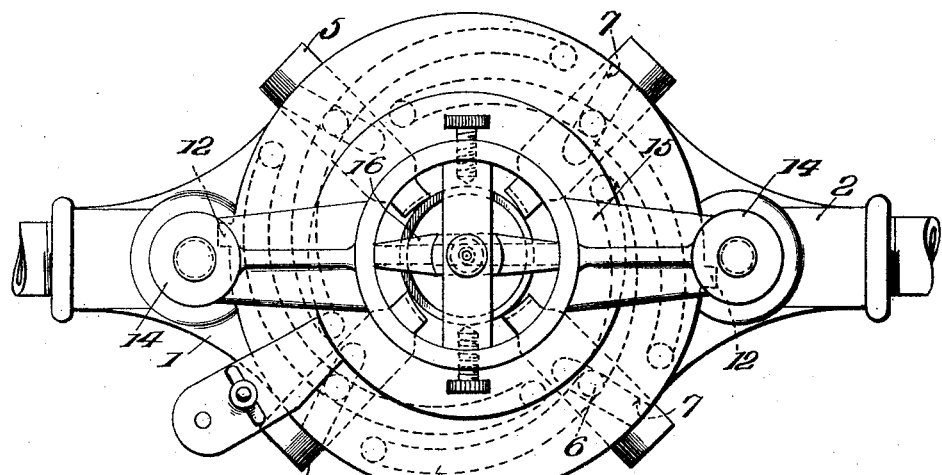
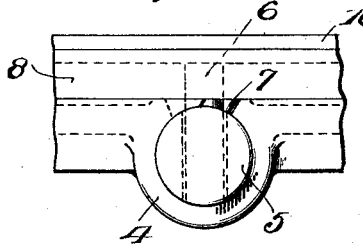
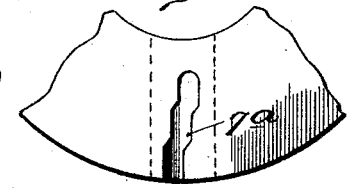
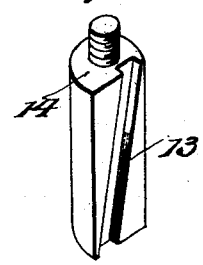
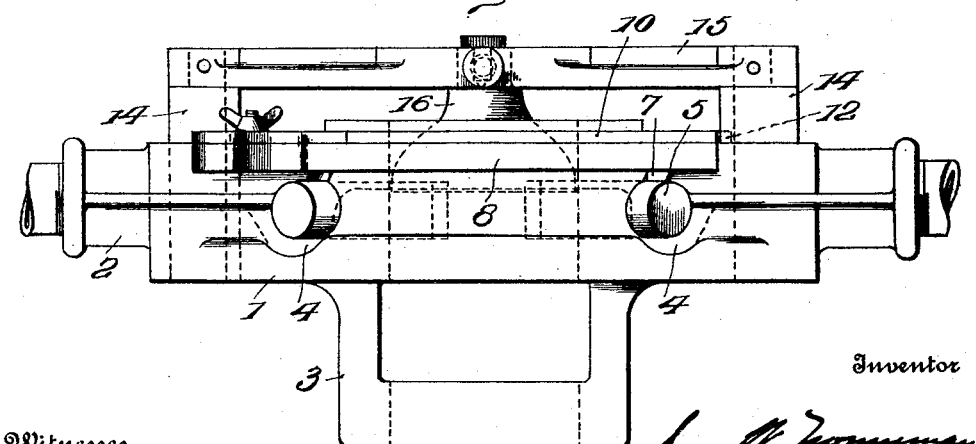
Witnesses
W. A. Williams
Inventor
Ira W. Nonneman
By
Attorney

UNITED STATES PATENT OFFICE.

IRA W. NONNEMAN, OF WARREN, OHIO, ASSIGNOR TO THE BORDEN COMPANY, OF WARREN, OHIO, A CORPORATION OF OHIO.

PIPE-THREADING TOOL.

1,115,727.  Specification of Letters Patent.  Patented Nov. 3, 1914.

Application filed January 19, 1914. Serial No. 813,015.

*To all whom it may concern:*

Be it known that I, IRA W. NONNEMAN, of Warren, in the county of Trumbull and State of Ohio, have invented certain new and useful Improvements in Pipe-Threading Tools; and I do hereby declare the following to be a full, clear, and exact description of the invention, such as will enable others skilled in the art to which it appertains to make and use the same.

The primary object of this invention is to obtain perfect thread formations on pipes of different diameters with one set of chasers having each a single cutting face.

It is well-known in the art that chasers having single cutting faces formed on one thread inclination in threading pipes of different sizes are capable of producing a perfect thread on only one size, namely, the size corresponding to the tap by which the chasers were threaded, and in consequence the threads on pipes of other diameters are more or less imperfect. This difficulty is overcome, according to my invention, by changing the angle of the cutting faces of the chasers relatively to the axis of the tool for each size of pipe, so that the thread angle of the chasers will always be exactly what is required, resulting in obtaining perfect threads with the standard number of convolutions per inch for each size.

In the accompanying drawings, Figure 1 is an end elevation. Fig. 2 is a side view. Fig. 3 is a fragmentary view. Fig. 4 shows a slight modification of the slot in the chaser-carrier. Fig. 5 is a view of a post.

I have shown my improvements as applied to a pipe-cutting tool of the class known as the "cross-bar" and of which Letters Patent No. 1,056,085 of March 18, 1913, and No. 1,076,188 of October 21, 1913, are illustrations, and while the invention is of special advantage in tools of this class, it is also advantageous in tools which require for their successful operation the use of a lead screw and a coöperating workholder.

My improvement is particularly designed for that class of tools employed for cutting tapered threads, the necessary taper being produced by the gradual recession of the chasers as the cutting operation progresses, but it may be used in any tool designed to cut threads on pipes of different diameters.

Referring to the drawings, 1 designates the chaser-carrier which is shown as provided with the usual handle sockets 2 and work-guide 3, the tool being normally rotated by the operator grasping the handles. In this chaser-carrier are formed a series of radially arranged sockets 4, each of which has a cylindrical bore open at its opposite ends. The chasers 5, which are designed to fit in these cylindrical sockets, are of corresponding formation in cross section, being reduced at their inner ends whereon the cutting threads are formed. Each chaser has a lug 6 projecting therefrom and which extends through a slot 7 formed in the carrier and opening into the sockets. Each slot is arranged diagonally to the axis of the chaser socket but parallel with the plane thereof. A center line drawn through a chaser lug slot at any point thereof will intersect the axial center of the chaser. In Figs. 1 to 3 these slots are shown as having straight corresponding parallel walls, but in Fig. 4 the slot is shown as composed of a series of connecting stepped sections 7ª. I prefer this latter construction for that in the recession of the chasers during a threading operation the angle of their cutting faces relatively to the axis of the tool remains unchanged.

In the drawings I have shown a chaser-engaging plate 8 provided, as usual, with a series of cam slots 9 for taking in the chaser lugs so that, in a known way, the recessions of the chasers will be controlled as the threading operation progresses. The rotation of the chaser-engaging plate relatively to the chaser-carrier controls the recession of the chasers as the cutting operation progresses, and likewise by rotating this cam plate the chasers may be adjusted to pipes or other articles of different diameters within the range of the tool. Any suitable means may be employed for actuating, or controlling the actuation of, such plate, and such means ordinarily partakes of the rotary movement of the chaser-carrier but not of its longitudinal travel. In the particular style of tool shown in the drawings a second plate 10 detachably secured to the chaser engaging plate has lugs 12 for fitting in grooves 13 arranged diagonally on two posts 14 which extend through openings in the chaser-carrier and are connected by a cross-bar 15 carrying a stop 16 for engaging the end of the work or pipe to prevent the posts from partaking of the longitudinal travel of the chaser-carrier. These features being well-known, further reference thereto is unnecessary. So far as the present invention is concerned it is immaterial whether the chaser-engaging plate be positively rotated relatively to the chaser-carrier by the post or by the pressure of the work acting outwardly on the chasers.

As the chasers are adjusted to fit the pipe to be threaded, they are turned axially as they are moved longitudinally in their sockets, thus changing the angle of their cutting faces to conform to the diameter of the work, with the result that regardless of the inclination a perfect thread will be formed on each size of pipe within the range of the tool. Were the angle of the cutting face always the same for all sizes, as has been the case heretofore, imperfect threads would be formed in each instance save one. For instance, in tools capable of threading pipes of different diameters, the chaser threads are always cut on an angle required for the largest size, and it follows that in cutting threads on pipes of less diameter the threads are not perfect, since where the thread pitch on several sizes is the same the inclination of the threads around the smallest size is much steeper than the inclination on the largest size. But by axially adjusting the chasers the angle of the cutting faces is changed to conform to the work required.

When the walls of the slots through which the chaser lugs project are on uniform parallel lines there is a slight change in the angle of the cutting faces of the chasers as the work progresses due to the recession of the chasers, but this is insufficient to impair the integrity of the thread. But by making the slots in stepped sections, as in Fig. 4, there is no axial turning during recession.

The advantages of my invention will be readily appreciated. By rotating the chasers the thread angle of the cutting faces thereof can be brought to exactly what is required for each diameter of pipe, and in consequence the proper thread formation is obtained with the uniform number of convolutions to the inch for each size. It will also be noted that by reason of the cylindrical bores or sockets and the corresponding formation of the chasers the sockets form complete housings or coverings for the chasers, and thus dispense with clamping means for holding the latter at true right angles to the axis of the tool.

I claim as my invention:

1. In a threading tool, in combination, a chaser carrier, a series of chasers, means for adjusting the chasers, and means coöperating with the chasers for changing the angle of the cutting faces thereof as they are adjusted for articles of different diameters.

2. In a threading tool, in combination, a chaser carrier, a series of chasers, means for adjusting the chasers longitudinally of their axes, and means for axially rotating chasers as they are adjusted for articles of different diameters.

3. In a threading tool, in combination, a chaser carrier, a series of chasers, means for controlling the recession of the chasers during the cutting operation, and means for changing the angle of the cutting faces of the chasers as the latter are adjusted for articles of different diameters.

4. In a threading tool, a chaser-carrier having cylindrical sockets, chasers of cylindrical formation in cross section fitted in said sockets, and means for axially rotating said chasers as they are adjusted longitudinally for articles of different diameters.

5. A threading tool comprising a chaser-carrier, a series of radially arranged chasers, an element common to all the chasers for adjusting them for articles of different diameters, and means for axially rotating said chasers as they are adjusted by said element.

6. In a threading tool, a chaser-carrier having cylindrical sockets and slots opening into said sockets and arranged at an angle thereto, chasers of cylindrical formation in cross-section fitted in said sockets and having lugs projecting through said slots, said chasers being axially rotated as they are moved longitudinally.

7. In a threading tool, a chaser-carrier having cylindrical sockets and slots opening into said sockets and arranged at an angle thereto, chasers of cylindrical formation in cross-section fitted in said sockets and having lugs projecting through said slots, a chaser-engaging plate having cam slots for taking in said lugs, and means coöperating with said plate for controlling the recession of the chasers.

8. A threading tool comprising a chaser-carrier having cylindrical sockets and slots opening into said sockets arranged at an angle thereto, said slots being composed of stepped sections, each section having walls substantially parallel with the axis of the sockets, and chasers of cylindrical formation fitted in said sockets and having lugs projecting into said slots.

9. A thread cutting tool comprising a chaser-carrier having cylindrical sockets open at their opposite ends, chasers of cylindrical formation fitted in said sockets, means for axially rotating the chasers as they are adjusted for articles of different diameters, and means for controlling the recession of the chasers as the cutting operation progresses.

In testimony whereof, I have signed this specification in the presence of two subscribing witnesses.

IRA W. NONNEMAN.

Witnesses:
M. W. BECHTEL,
E. R. OTT.